US011054976B2

(12) United States Patent
Cengil et al.

(10) Patent No.: US 11,054,976 B2
(45) Date of Patent: Jul. 6, 2021

(54) METHOD FOR OPERATING A VEHICLE INFORMATION SYSTEM WITH AT LEAST A FIRST AND A SECOND DISPLAY AREA AND VEHICLE INFORMATION SYSTEM

(71) Applicant: VOLKSWAGEN AKTIENGESELLSCHAFT, Wolfsburg (DE)

(72) Inventors: Sükrü Cengil, Burgwedel (DE); Anna Braun, Braunschweig (DE)

(73) Assignee: Volkswagen Aktiengesellschaft

( * ) Notice: Subject to any disclaimer, the term of this patent is extended or adjusted under 35 U.S.C. 154(b) by 327 days.

(21) Appl. No.: 15/648,492

(22) Filed: Jul. 13, 2017

(65) Prior Publication Data

US 2018/0018083 A1 Jan. 18, 2018

(30) Foreign Application Priority Data

Jul. 15, 2016 (DE) ...................... 10 2016 113 112.1

(51) Int. Cl.
*B60K 35/00* (2006.01)
*G06F 3/0484* (2013.01)
(Continued)

(52) U.S. Cl.
CPC .......... *G06F 3/04847* (2013.01); *B60K 35/00* (2013.01); *B60K 37/06* (2013.01);
(Continued)

(58) Field of Classification Search
CPC ................. G06F 3/048; G06F 3/04847; G06F 2203/04803; G06F 2203/04804;
(Continued)

(56) References Cited

U.S. PATENT DOCUMENTS 7,642,901 B2 * 1/2010 Kato .................... G01C 21/265
340/438
7,954,951 B2 * 6/2011 Kuno ..................... B60K 35/00
353/12
(Continued)

FOREIGN PATENT DOCUMENTS

DE 102004038916 A1 3/2005
DE 102008016527 A1 3/2009
(Continued)

*Primary Examiner* — Mahelet Shiberou
(74) *Attorney, Agent, or Firm* — Barnes & Thornburg LLP

(57) ABSTRACT

A method for operating a vehicle information system having at least a first display area and a second display area. An activation signal and a transition signal are received in succession. Graphical data for an activation animation containing a first view and a second view is generated based on the activation signal and the transition signal, and displayed by the first display area and second display area. After the activation signal is received, an appearing of the first view is output, wherein the first view has a first graphical object. After the transition signal is received, a disappearing of the first view and an appearing of the second view are output, wherein the appearing of the second view has a movement effect which depicts a movement from the first display area to the second display area. Also disclosed is a vehicle information system.

23 Claims, 7 Drawing Sheets

(51) Int. Cl.
*B60K 37/06* (2006.01)
*G06T 13/80* (2011.01)

(52) U.S. Cl.
CPC ..... *B60K 2370/11* (2019.05); *B60K 2370/165* (2019.05); *B60K 2370/182* (2019.05); *B60K 2370/194* (2019.05); *B60K 2370/33* (2019.05); *B60K 2370/347* (2019.05); *B60K 2370/52* (2019.05); *G06F 2203/04803* (2013.01); *G06F 2203/04804* (2013.01); *G06T 13/80* (2013.01)

(58) Field of Classification Search
CPC ........ B60K 35/00; B60K 35/40; B60K 37/06; B60K 2370/194; B60K 2370/182; B60K 2370/11; B60K 2370/165; B60K 2370/33; B60K 2370/52; B60K 2370/347; G06T 13/80; G06T 13/20; G06T 13/40; G06T 13/00; A63F 13/10
See application file for complete search history.

(56) References Cited

U.S. PATENT DOCUMENTS

| | | | |
|---|---|---|---|
| 8,872,639 B2 | 10/2014 | Kinoshita et al. | |
| 2004/0095373 A1* | 5/2004 | Schmidt | G06F 3/0481 |
| | | | 715/716 |
| 2004/0189546 A1* | 9/2004 | Sumiyoshi | B60K 37/02 |
| | | | 345/8 |
| 2005/0154505 A1* | 7/2005 | Nakamura | G01C 21/365 |
| | | | 701/1 |
| 2007/0030133 A1* | 2/2007 | Campbell | B60K 35/00 |
| | | | 340/438 |
| 2008/0309475 A1* | 12/2008 | Kuno | B60K 35/00 |
| | | | 340/462 |
| 2012/0218295 A1 | 8/2012 | Hashikawa et al. | |
| 2013/0127608 A1* | 5/2013 | Ishikawa | B60K 37/02 |
| | | | 340/425.5 |
| 2013/0127609 A1* | 5/2013 | Sitarski | B60R 1/00 |
| | | | 340/438 |
| 2013/0307757 A1* | 11/2013 | Yasumoto | G09G 3/36 |
| | | | 345/32 |
| 2015/0210164 A1* | 7/2015 | Oh | G06F 3/03548 |
| | | | 200/1 R |
| 2017/0287193 A1* | 10/2017 | Hisada | B60K 35/00 |

FOREIGN PATENT DOCUMENTS

| | | | | |
|---|---|---|---|---|
| DE | 102013000273 A1 | | 7/2014 | |
| EP | 2190686 A1 | | 6/2010 | |
| JP | 2007064761 A | | 3/2007 | |
| JP | 2012240467 A | | 12/2012 | |
| KR | 2014-0109378 | * | 8/2014 | ............ B60K 37/02 |
| WO | 2015071961 A1 | | 3/2017 | |

* cited by examiner

METHOD FOR OPERATING A VEHICLE INFORMATION SYSTEM WITH AT LEAST A FIRST AND A SECOND DISPLAY AREA AND VEHICLE INFORMATION SYSTEM

PRIORITY CLAIM

This patent application claims priority to German Patent Application No. 10 2016 113 112.1, filed 15 Jul. 2016, the disclosure of which is incorporated herein by reference in its entirety.

SUMMARY

Illustrative embodiments relate to a method for operating a vehicle information system comprising at least a first display area and a second display area. Illustrative embodiments also relate to a vehicle information system.

BRIEF DESCRIPTION OF THE DRAWINGS

The disclosed embodiments are now explained with reference to the drawings.

DETAILED DESCRIPTION

Figure 1:
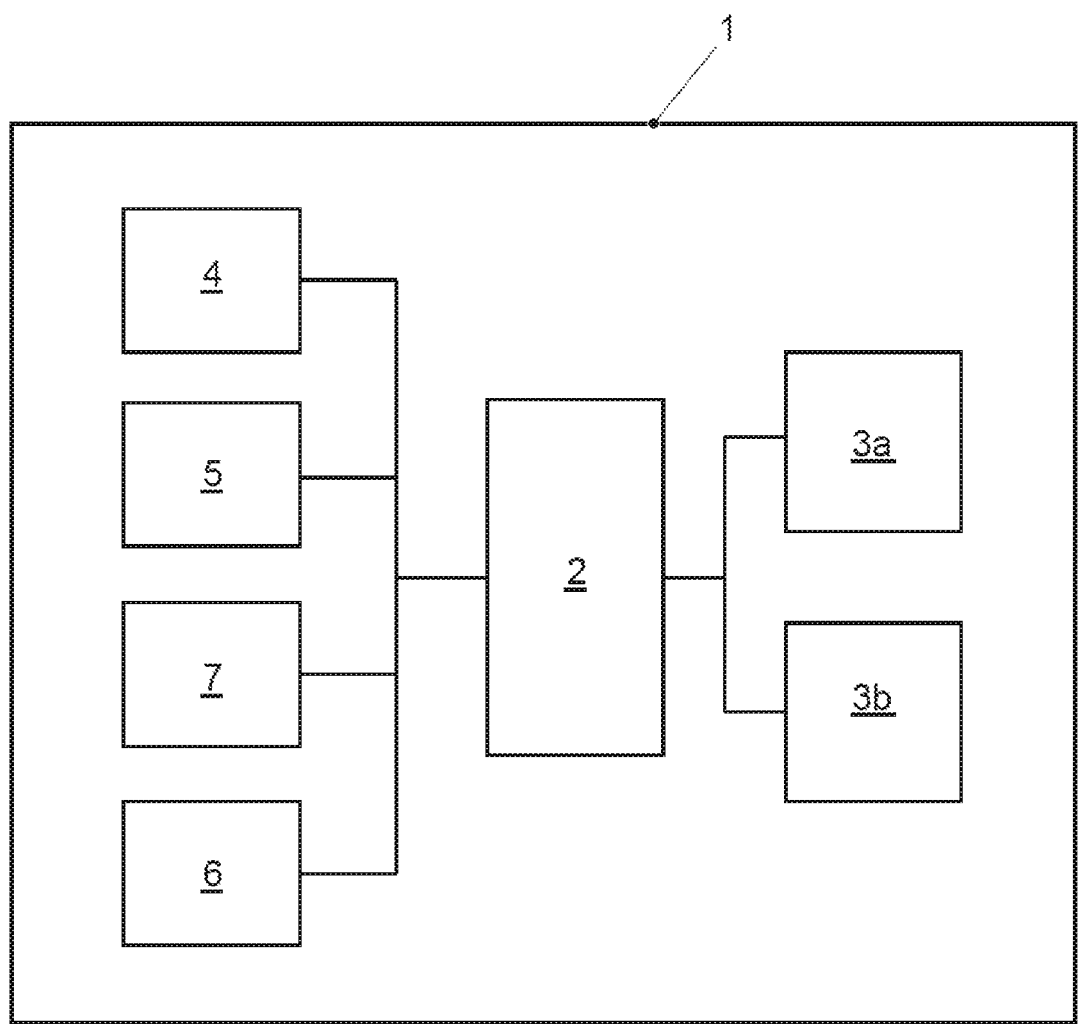
FIG. 1 shows a vehicle containing an exemplary embodiment of the disclosed vehicle information system.

To improve safety and convenience when driving a vehicle, a user of a vehicle is provided with a wealth of information, for instance, to make it easier to monitor driving and vehicle operation, to be informed about the activity of driver assistance systems or to make it simpler to manage ancillary organizational tasks. In this context, modern vehicles are increasingly being fitted with complex processing systems, which must be started and booted up when the vehicle is put into operation and at the start of a journey. In known systems, this process often involves unwanted delays and waits before the driver can perform the operation required or retrieve certain information. In addition, using a plurality of display areas can mean that there is no coherence in the implementation of displays in a vehicle and it is harder to comprehend extensive information.

Disclosed embodiments provide a method for operating a vehicle information system and to provide a vehicle information system of the aforementioned type, for which method and system it is possible to comprehend the coherence of a plurality of display areas within the vehicle information system in a manner that is quick to comprehend.

In the disclosed method of the type mentioned in the introduction, an activation signal and a transition signal are received in succession. Graphical data for an activation animation containing a first view and a second view is generated based on the activation signal and the transition signal, and displayed by the first display area and second display area. In this process, after the activation signal is received, an appearing of the first view is output, the first view comprising a first graphical object. In addition, after the transition signal is received, a disappearing of the first view and an appearing of the second view are output, wherein the appearing of the second view comprises a movement effect. The movement effect depicts a movement from the first display area to the second display area.

It is indicated clearly by the activation animation that the two display areas in a vehicle information system are also linked to one another in terms of content. This is achieved by displaying an activation animation which, based on at least two signals, namely the activation signal and the transition signal, makes comprehensible a transition between the first view and the second view. The signals can be understood to be a first trigger and a second trigger. In addition, the activation animation can be created as a standby animation to bridge a waiting period for the user and to indicate an activity of the system.

According to the disclosed embodiments, at least a first display area and a second display area are provided, although more display areas can also be used. The display areas are spaced apart from one another. In addition, the display areas can be fixed in place or be movable, for instance, pivotable. Moreover, the activation animation can take into account the positions of the display areas relative to one another.

The activation signal is received in advance of the transition signal, and it can be provided that the transition signal is not received until after the first view appears in full, or that the effect of the transition signal on the view does not become visible until after the first view appears. A certain time interval is provided between the two signals in this case. To generate the activation animation, it is sufficient that the activation signal has been received, whereas the transition signal can be received even during the output of the activation animation. For instance, some of the activation animation can be coordinated with receiving the transition signal, i.e., can be output simultaneously or time-offset therefrom, for example.

The creation of the activation animation based on the activation signal and the transition signal can be performed in various ways. For instance, the signals may have different characteristics, and the graphical data can be generated based on these characteristics. It can also be provided that the respective times at which each of the two signals are received are taken into account.

The signals can be received in different ways known per se. For instance, a control operation by a user can be detected, or a certain state of the vehicle or of one of its devices can be detected. In addition, sensors of the vehicle can be used to generate the activation signal and/or transition signal.

According to at least one disclosed embodiment of the method, the activation signal or the transition signal is received when an approach action, an unlocking action, a door-opening, a user entering or sitting down or a vehicle being started is detected. The activation animation can thereby be synchronized with important preparatory operations for a journey with the vehicle. Signals received in this manner can also be used to determine whether the driver is in a specific preparatory stage for the journey with the vehicle.

According to at least one disclosed embodiment, the appearing of the first view and/or second view involves a fade-in. This can be used to produce a smooth transition between different views, whereas abrupt transitions would potentially make it harder to comprehend the data that is output. The user can thereby comprehend a view easily without having to reorient himself completely after the transition from the first view to the second view.

"Fade-in" is understood in this context to mean that a transition from a darker to a brighter depiction is generated for an object of a view. Other graphical effects can be used similarly, for instance, a change in the transparency, the contrast, the coloration or other properties. An emergence of the object from a background can be depicted.

Similarly, it can be provided that the disappearing of the first view and/or second view involves a fade-out. This can be understood in comparison with the fade-in as the reverse graphical effect, for instance, by a transition from a bright to a dark depiction or by changing other graphical properties of the view or of depicted objects.

The appearing and disappearing of the first view and/or second view can be generated in this case for the particular view as a whole or in a similar manner for individual elements of the view. When a view disappears, for instance, individual depicted elements of the view can be faded out successively. In addition, different graphical effects can be applied to different elements, for instance, a transition from bright to dark for a first element of the view, and a transition from low to high transparency for another element of the view.

Alternatively or additionally, other forms of representation can be used to generate an appearing and/or disappearing of the views, for instance, a movement of elements of the particular view, for example, in the sense of elements of the view "flying away" or "flying in", depicting movement of the elements from a region outside the displayable view or movement out of the displayable view.

The first graphical object is created in a manner known per se and can comprise a trademark, in particular a logo or symbol of a company. This can achieve good recognizability and integration in another design concept. In this context, a trademark of a manufacturer of the vehicle or of the vehicle information system can be depicted. In addition, the trademark can be depicted dynamically, for instance, by a movement of elements of the view.

It can also be provided that the first view is adjustable. For instance, it can be configured by the user and/or a personalized view can be generated and output for the user.

According to one development, an animation sequence is retrieved from a non-volatile storage medium to generate the graphical data for the first view. The first view can be displayed in a quick and easy-to-process manner.

It is intended in this case that a predetermined view is output as a first view, avoiding the need, for example, to boot up more complex systems, for instance, a more complex processor system. In addition, the appearing of the first view and also a first segment of the activation animation can be preset.

The movement effect provided can be created in different ways. One way is a graphical effect that involves a change in position over time. In this case, the movement effect can be created such that the geometry of the arrangement of the first display area and second display area in the vehicle is taken into account. A movement from the first display area to the second display area is depicted here, with it also being possible to depict a movement in another direction, for instance, away from the second display area.

Propagation of a pulse can be depicted, for example, by depicting a spatial advance of a certain graphical property of the view across the area of the first display area and/or second display area. The graphical property of the view can relate to different parameters of the graphical view, for instance, a brightness. Alternatively or additionally, the movement effect may comprise a displacement and/or a rotation. It can also be provided to depict a spreading action, in which case an extent of a view and/or a property of a view is generated over a certain sub-area.

According to another disclosed embodiment, the movement effect comprises depicting a movement of a region of heightened brightness. The movement effect can thereby be depicted in a manner that is easy to comprehend. Propagation of a light pulse can be depicted in this manner, for instance. Similarly, a movement of a region that is less bright than the surrounding area can also be output, or a movement of a region that is a contrasting region in the sense of having a different property can be depicted.

According to another development, the first graphical object of the first view is displayed by the first display area. This allows the first display area to be used for a first output of data even before the transition to the second view has been completed based on the transition signal. In this case, it is intended that for the first view, the second display area is not used for the output, and instead does not output any view or outputs a specific other view, which is created independently of the first view, for instance.

According to a development, the second view is displayed by the first display area and the second display area. Hence both the first display area and the second display area can be used to output data based on the second view. A larger area can thereby be used, for example, to output a larger amount of information in a structured and clear manner. In addition, an integrated display strategy can be used, in which the display areas output a range of additional information.

According to a development, the second view comprises a first display object and a second display object, each of which comprise a dial and a pointer element. This can be used to display parameters.

In this case, display objects are graphical objects that can be used to output an indication of a value of a parameter. For example, circular instruments, or representations of analog circular instruments, also referred to as "gauges", can be used for this purpose. Such gauges typically indicate parameters such as the speed, engine speed or an operating mode of a vehicle. It is intended here that the display objects are displayed by the first display area.

According to another disclosed embodiment, operating data of a vehicle is also acquired, and the second view is generated based on the acquired operating data. This allows the view to be used to output relevant operating data for the user.

The operating data can be displayed in this case in a manner known per se, for instance, by the gauges and/or other graphical elements for data output. For instance, a charge level and/or state of an energy storage device, an ambient temperature and/or interior temperature can be displayed. In addition, information relating to a processing system can be displayed, for instance, information about available and/or currently running application programs, for example, a media playing program. It is possible to include here also operating data from other devices that are in data communication with the vehicle, for instance, from a mobile user device such as a mobile phone or a mobile computer.

According to a development, a digital instrument cluster of a vehicle comprises the first display area, and/or a center console display of the vehicle comprises the second display area. This makes use of displays that are typically provided in vehicles and that can be used to output the data in an easily comprehensible manner. It can be provided here that the first view is output by the digital instrument cluster, whereas in the transition to the second view, propagation of the view is displayed on the center console display.

It can also be provided that a mobile unit, for instance, a mobile phone or a mobile computer of the user, comprises one or more of the display areas. Again in this case, the activation animation can be output in a similar manner.

According to a development, during the display of the activation animation, a start-up procedure of a processor is performed, in which procedure the activation animation is generated according to a progress over time of the start-up procedure, and displayed. The activation animation can be generated thereby such that the output of the second view is complete at the end of the start-up procedure. The activation animation can thereby be used as a standby animation to provide the user with better information on the delay until the processor is fully operational.

This can achieve that the start-up procedure, for instance, the boot-up of the processor, is not perceived merely as an irritating delay in the process but instead that the user recognizes that the system is already active and the fully booted-up state is being established. The time period between starting the system and reaching a fully operational state can depend here on various circumstances, in particular on the time needed to load operating data and for automatic testing of system components. During this period, typically an empty screen is displayed or a view such as an egg timer is output, with the result that the user cannot identify how far the start-up procedure has advanced. In contrast, the delay can be made more understandable to the user by generating the activation animation according to a progress over time of the start-up procedure.

In this case, the progress over time can be determined during the boot-up, for instance, based on the completion of certain segments of the boot-up procedure. In addition, a certain time period can be provided for the boot-up, so that the progress over time of the activation animation can be generated based on a preset progress over time.

According to another development, the second view comprises at least one display object and an application region, the application region comprising application areas. It is thereby possible to create clearly demarcated regions in which specific data can be output.

In this case, the at least one display object can be embodied as the above-described circular instrument. An area of the view that can be used to output additional data, for instance, for displaying and operating application programs, can be provided as the application region, which application programs can be executed by a processor of the vehicle and of a mobile device.

The application region can be embodied as a background view, for example. An intermediate space formed by two display objects displayed in the foreground, for instance, a space between two circular instruments, can be used for displaying the background view. An intermediate space enclosed by two depicted circular instruments can hence be used as the application area, for instance, on a display area of a digital instrument cluster; in addition, at least part of the application area can also be arranged inside the circular instruments. Moreover, the application region can be embodied on the second display area, in particular a center console display.

The data from the application programs is displayed using application areas, wherein a specific region of the area of the application region is associated with the data of a specific application program. The region of the area, which region is associated with an application program, is embodied as an application area, in particular as a tile, widget or window.

According to a development, the application areas of the second view are associated with applications, and output data from the applications is displayed in the display areas after the second view has appeared. Output data from applications, i.e., from application programs, is thereby output by the second view.

It can be provided that the second view appears in two stages: in a first stage, the application areas can be depicted, although it is intended that any specific contents from the application programs associated with the application areas are still not output in the first stage. A structure, for instance, a framework, and showing the partitioning of the area can be displayed for instance. For example, the depiction is made in this first stage such that it is possible to gather the dimensions of the application areas, for instance, can be gathered from frames of the respective application areas. Then in a second stage, output data from each of the associated application programs is displayed inside the respective application areas.

In the first stage, a tile structure or template can be depicted, for instance, by which the outlines of the application areas can be recognized. It can be provided here that a relationship is already made with each of the associated application programs, for instance, by a preset view. In addition, a dynamic depiction can be made in the first stage, for instance, by a movement or a depicted light effect of the application areas. For example, a movement of a depicted highlighting can be output.

Then in the second stage, the application areas can be filled with output data from the application programs, for instance, by outputting in the region of the associated application area a depiction generated dynamically by an application program. Again in this case it is possible that a movement or a depicted light effect is also output.

The vehicle information system comprises a receive unit, which can be used to receive an activation signal and a transition signal, and comprises a graphics unit, which can be used to generate based on the activation signal and the transition signal, graphical data for an activation animation comprising a first view and a second view. It also comprises a first display area and a second display area, which can be used to display the graphical data. In this system, after the activation signal is received, an appearing of the first view can be output, wherein the first view comprises a first graphical object, and after the transition signal is received, a disappearing of the first view and an appearing of the second view can be output, wherein the appearing of the second view comprises a movement effect. The movement effect can depict a movement from the first display area to the second display area.

The disclosed vehicle information system is designed to implement the above-described method. Thus the disclosed vehicle information system has the same benefits as the disclosed method.

The activation signal and the transition signal are acquired here in a manner known per se with the provision of an interface to a device of the vehicle, which interface can be used to transfer an acquired signal to the vehicle information system.

A vehicle containing an exemplary embodiment of the vehicle information system is described with reference to FIG. 1.

A vehicle 1 comprises a first display area 3a and a second display area 3b. In the exemplary embodiment, the digital instrument cluster of the vehicle 1 comprises the first display area 3a, whereas a center console display of the vehicle 1 comprises the second display area 3b. The display areas 3a, 3b are coupled to a control unit 2. Also coupled to the control unit 3 are a receive unit 4, a graphics unit 5, a processor 6 and a non-volatile storage medium 7.

An exemplary embodiment of the disclosed method is described with reference to FIG. 1. This description is based on the above-described vehicle information system.

In a first operation, the receive unit 4 receives an activation signal. According to the exemplary embodiment, the activation signal is generated by a device of the vehicle 1 that detects unlocking of the vehicle 1. In other exemplary embodiments, other events and states trigger the activation signal, for instance, opening a door of the vehicle or a driver approaching the vehicle 1. Alternatively or additionally, the activation signal can also be generated by other events.

According to the exemplary embodiment, a start-up procedure of the processor 6, in particular booting-up of the processor 6, is also performed based on the activation signal. It is continuously detected during this procedure how much of the boot-up has been completed and how long the start-up procedure will still last. During the boot-up, output data is loaded from application programs of the processor 6 and/or new output data is generated, which data can then be displayed.

Based on the activation signal, the graphics unit 5 generates graphical data for a first view, which is then output by the display areas 3a, 3b. In this case, it is intended in the exemplary embodiment that the first view produces only a display on the first display area 3a, while the second display area 3b remains dark. The first view is explained in detail below.

In a further operation, the receive unit 4 receives a transition signal Like the explanations above relating to the activation signal, the transition signal can also be received in various ways. For instance, the transition signal can be generated when closure of a driver door of the vehicle 1 is detected or sitting-down on a driver seat is detected. Alternatively or additionally, the activation signal can also be generated by other events. Moreover, the transition signal can be generated automatically, for instance, after a certain time period has elapsed or according to the progress of the start-up procedure of the processor 6.

Based on the transition signal, the graphics unit 5 generates graphical data for a second view, which is then output by the display areas 3a, 3b. In this case, it is intended in the exemplary embodiment that the second view is distributed over the first display area 3a and second display area 3b. In the exemplary embodiment, operating data of the vehicle 1 is acquired, and the second view is generated based on the acquired operating data. The operating data can broadly relate to all the information about the operation of the vehicle 1, for instance, data about the movement of the vehicle 1 or about application programs being executed by the processor 6. The second view is also explained in detail below.

The appearing of the first view and/or second view is performed by a fade-in, with the particular view appearing by continuously increasing the brightness, starting from a dark screen of the first display area 3a. This is depicted by a suitable animation sequence. Other techniques known per se are used here alternatively or additionally to display the process of the appearing of the views, for instance, by elements appearing separately, from which the views then appear to be put together.

According to the exemplary embodiment, an animation sequence is retrieved from the non-volatile storage medium 7 to produce the graphical data for the first view. In other words, the animation sequence, which is output when the first view appears, need not be regenerated every time the method is carried out, but already exists and only needs to be loaded in a suitable form and played out.

After the transition signal is received, the first view disappears and the second view appears. In this process, a transition is also depicted, which again involves an animation sequence, at the end of which lies the display of the complete second view. The transition is created such that it extends substantially over the time period of the boot-up of the processor 6.

It is again possible in this case, at least sometimes, to retrieve an animation sequence from the non-volatile storage medium 7, thereby allowing a reduction in the processing capacity required.

It can be provided in other exemplary embodiments that different characteristics of the activation signal and/or of the transition signal can be received, for instance, different events can cause signals to be generated, or a specific driver can be detected. It can also be provided in this case that the first view and/or second view and/or the transition is generated differently and, for instance, a personalized, driver-customized output is generated.

An exemplary embodiment of a display generated by the disclosed method on a display area is described with reference to FIGS. 2A to 2F. This description is based on the disclosed vehicle information system and the disclosed method for the operation of the system that are described above.

After the activation signal is received, the graphics unit 5 generates and outputs graphical data for the first view 10. According to the exemplary embodiment shown, for the first view 10, a display is made only on the first display area 3a, while the second display area 3b remains empty.

Figure 2A:
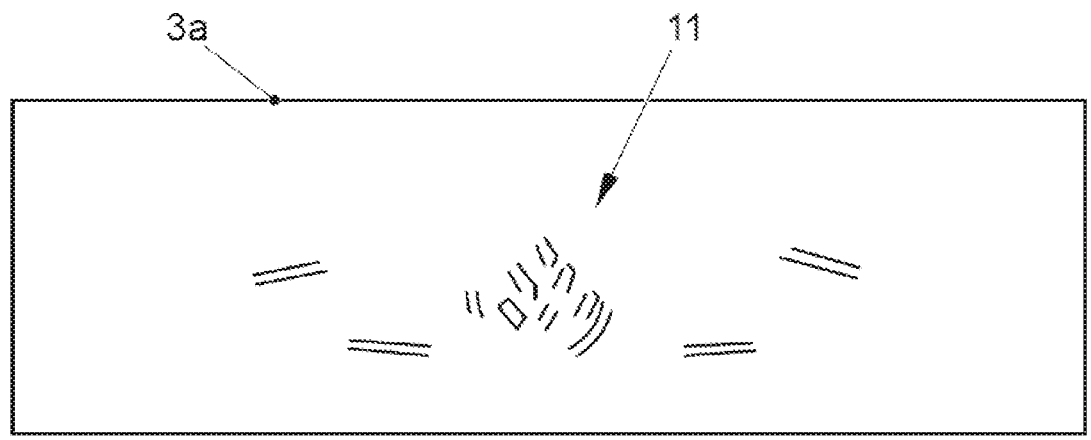
FIGS. 2A-2F show an exemplary embodiment of a display produced by the disclosed method on one display area.
Figure 2B:
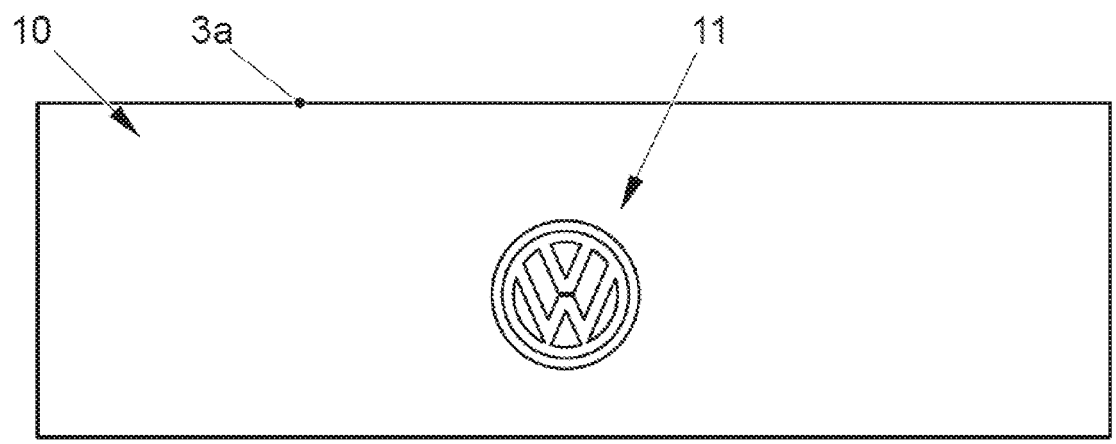

FIGS. 2A and 2B show the appearing of the first view 10, with a fade-in of a first graphical object 11 being indicated by dashed lines in FIG. 2A. In the exemplary embodiment, the first graphical element 11 is a logo of a vehicle manufacturer. Alternatively or additionally, other graphical objects can be included, for instance, a profile picture of a user or another element.

The appearing of the first graphical object 11 is depicted by a continuous increase in its brightness, starting from a dark screen of the display area 3a. It is additionally provided in the exemplary embodiment that other light effects are output in the region of the display area 3a, for instance, a light shimmer that moves across the display area 3a. In the case shown in FIG. 2B, the first view 10 has finally appeared in full on the first display area 3a.

In other exemplary embodiments, an animated first graphical object 11 can be provided, which, for instance, moves continuously and/or for which a display parameter, for instance, a color or brightness, changes dynamically.

Figure 2C:
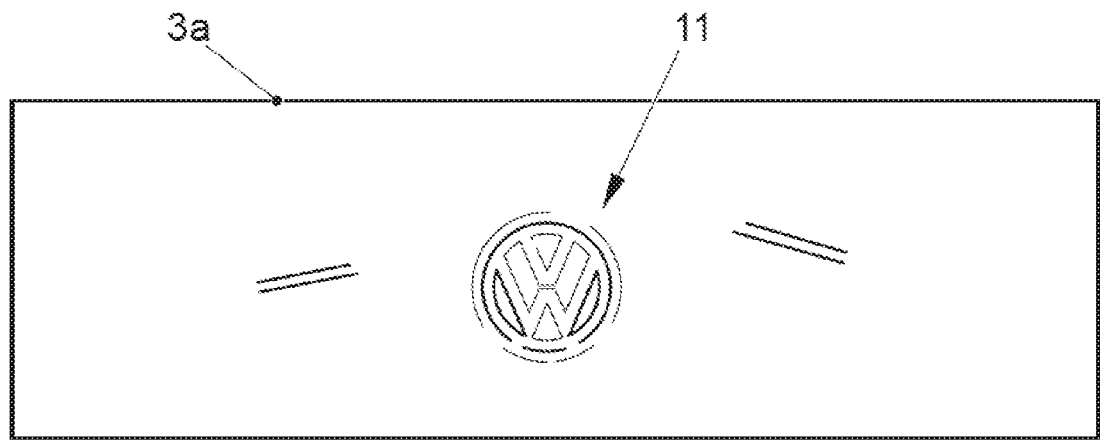
Figure 2D:
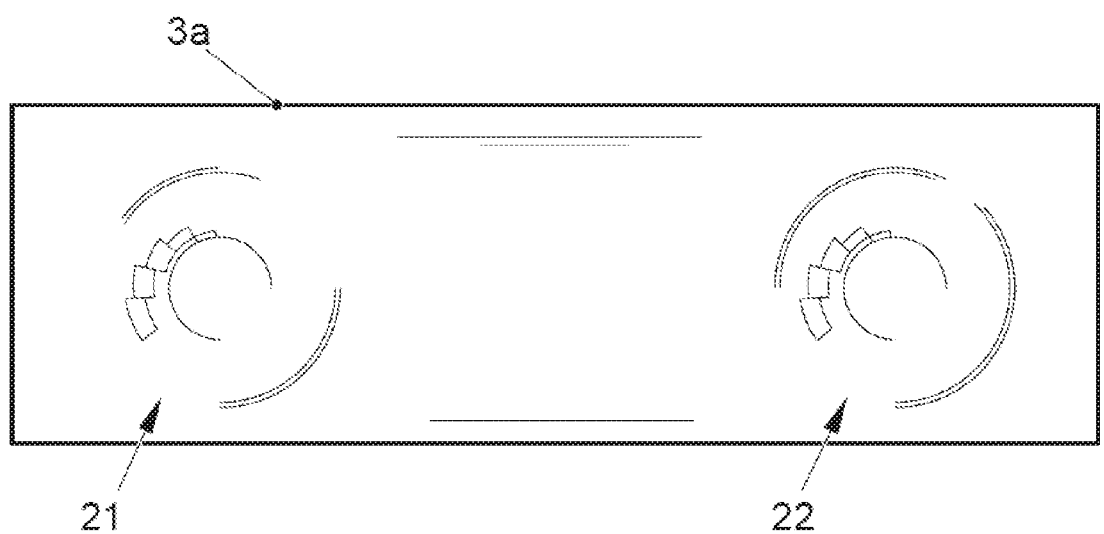
Figure 2E:
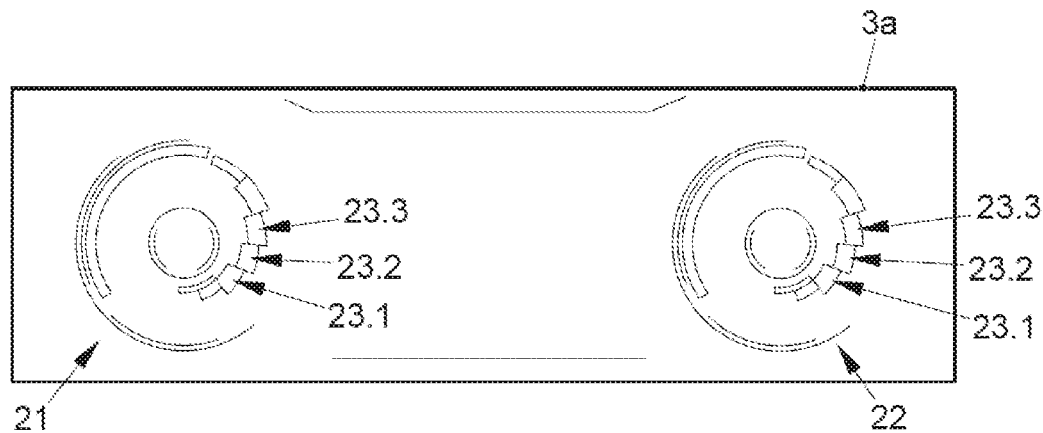
Figure 2F:
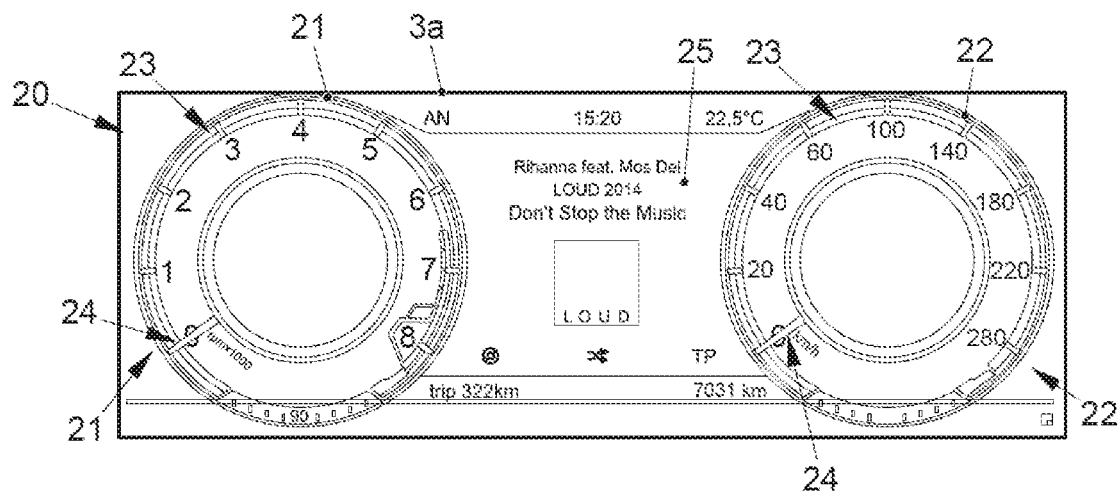

In the case shown in FIG. 2C, a transition signal has been received and a transition to the display of the second view 20 initiated. The first graphical object 11 disappears, which is depicted by a fade-out indicated by dashed lines. At the same time, the second view 20 appears, this being depicted by a combination of fade-in using increasing brightness and elementary structure with a movement of individual depicted elements. Thus the appearing of the second view comprises a movement effect. The outlines of the display object 21, 22 of the second view 20 are already indicated in FIG. 2D. In the case shown in FIG. 2E, in addition a construction animation for dials 23 is depicted by dial segments 23.1, 23.2, 23.3 appearing and moving; these segments appear in the central region of the display objects 21, 22, which are being formed as circular instruments, and then move in a coordinated manner from the center towards the edge, where they assume a final position at the circumference of the display objects 21, 22. The dials 23 are thereby constructed piece by piece. In the case shown in FIG. 2F, a pointer element 24 has additionally appeared for each of the display objects 21, 22, which element is created in the example as a light beam that illuminates a specific position on the dial 23 and thereby indicates a value.

The display objects 21, 22 shown here are created as circular instruments, such as those known from digital instrument clusters. The speed of the vehicle 1 and the engine speed of the vehicle 1 are displayed therein. In other exemplary embodiments, different forms and designs can be implemented and different values can be output. In addition, more than the two display objects 21, 22 can be provided, for instance, an additional circular instrument or an object for numerical display can be provided.

An intermediate space, which is embodied as a background view in the exemplary embodiment, is formed between the display objects 21, 22, with the display objects 21, 22 being displayed in the foreground and appearing to be superimposed on the background view. The area of the intermediate space is used here as an application region 25, in which is displayed output data from various devices of the vehicle 1. For instance, this may be an output from a media player; in addition, output data from a navigation system or another driver assistance system may be output, for example.

Alternatively or additionally, other effects, for instance, using the color design of the display, may be provided in other exemplary embodiments to output the appearing and disappearing of views 10, 20.

An exemplary embodiment of a display generated by the disclosed method on two display areas is described with reference to FIGS. 3A to 3G. This description is based on the disclosed vehicle information system and the disclosed method for the operation of the system that are described above.

The animation described below defines a wake-up scenario, in which the appearing of the first view 10 on the first display area 3a, in this case an active info display, is displayed by a logo as the first graphical object 11. Proceeding from this first view, a transition to the second view 20 is generated, in which transition a pulse 12 in graphical form moves to the second display area, in this case a head unit.

This pulse 12 is passed on synchronously into the head unit and hence constructs the entire structure of the second view 20. In the process, application areas 25.1, 25.2, 25.3 associated with specific applications of the processor 6 are displayed, and on the area of which can be displayed output data (also referred to as interface content) from these applications. The application areas 25.1, 25.2, 25.3 are initially displayed empty and form in this case a framework (interface structure), which at the end of the animation defines an arrangement for the loaded output data.

In the case shown here, the second view is a graphical user interface, wherein, for the second display area 3b, a touch-sensitive interface can be used for operation.

Figure 3A:
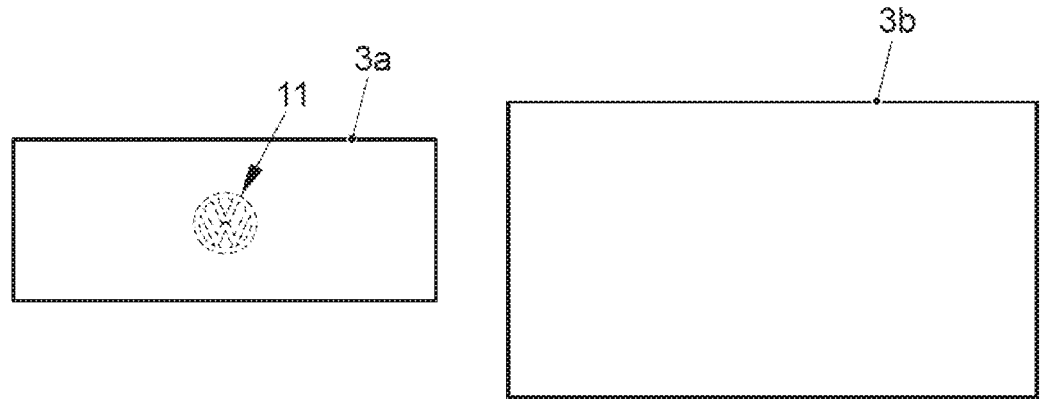
FIGS. 3A-3G show an exemplary embodiment of a display produced by the disclosed method on two display areas.
Figure 3B:
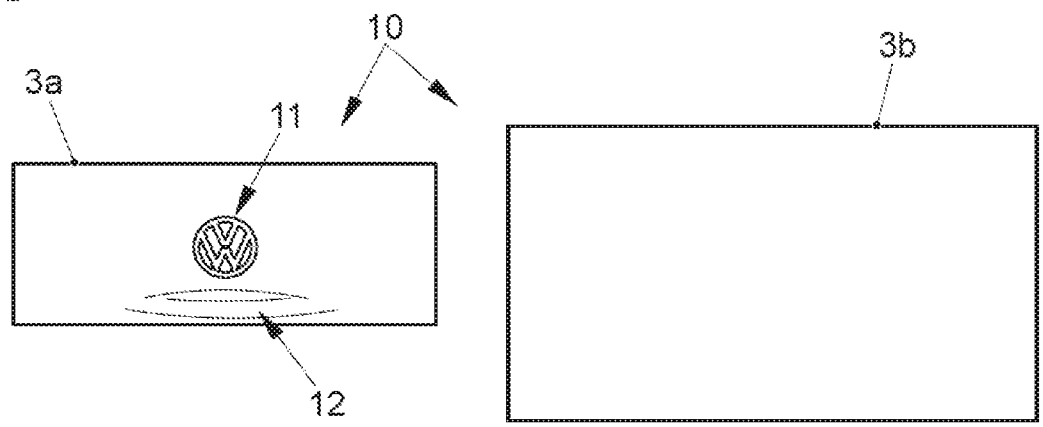
Figure 3C:
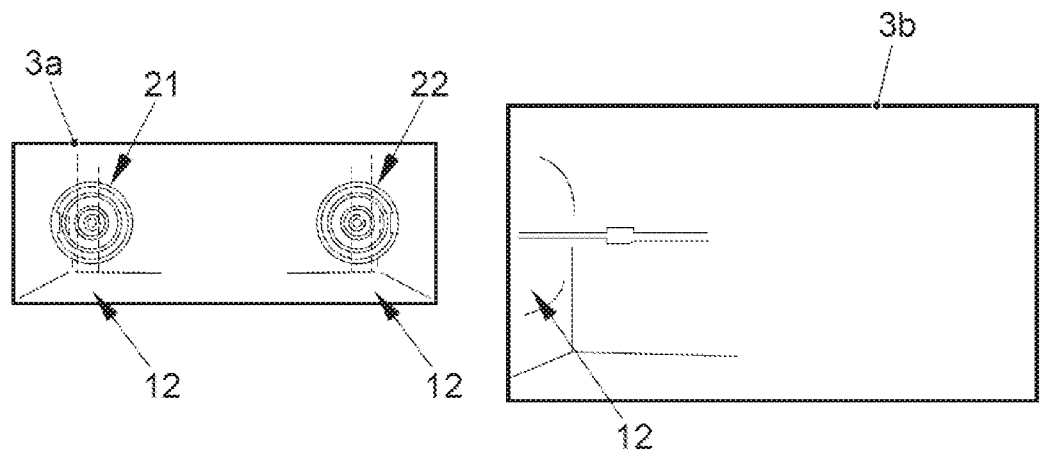

In a first operation, which is shown in FIGS. 3A and 3B, when the vehicle 1 is unlocked, the activation signal is received, and the appearing of the first view 10 is initiated. The animation sequence for the view is obtained from the non-volatile storage medium 7 and runs substantially as described above with reference to FIGS. 2A to 2F. According to the exemplary embodiment, in this operation a display is made only by the first display area 3a, while the second display area 3b remains dark.

The processor 6 of the vehicle 1 is started up and a boot-up performed in the background. This process involves loading data and launching programs. The loading progress over time is detected and the time at which the boot-up is expected to be finished is determined. The wake-up scenario is designed in this case to finish substantially at the same time as the boot-up of the processor 6.

In a further operation, when the driver door is closed, the transition signal is received and a transition to the second view 20 is output. The depiction of the transition and the appearing of the second view 20 comprise a movement effect from the first display area 3a to the second display area 3b. In this effect, a light pulse 12 is depicted emanating from the region of the first graphical object 11 and propagating towards the second display area 3b, with an appearing of the second view 20 being displayed synchronously with the movement of the light pulse 12. In this case, a construction is made from the center of the first display area 3a and the center of the second display area 3b.

The light pulse 12 emanating from the first display area 3a is passed on towards the second display area 3b synchronously with a certain time instant. The second view 20 is then constructed synchronously with the movement of the light pulse 12. This process takes account of the arrangement of the display areas 3a, 3b in the vehicle 1, i.e., the direction of movement of the light pulse 12 is designed such that a continuous progression of the movement is depicted in the vehicle 1.

Figure 3D:
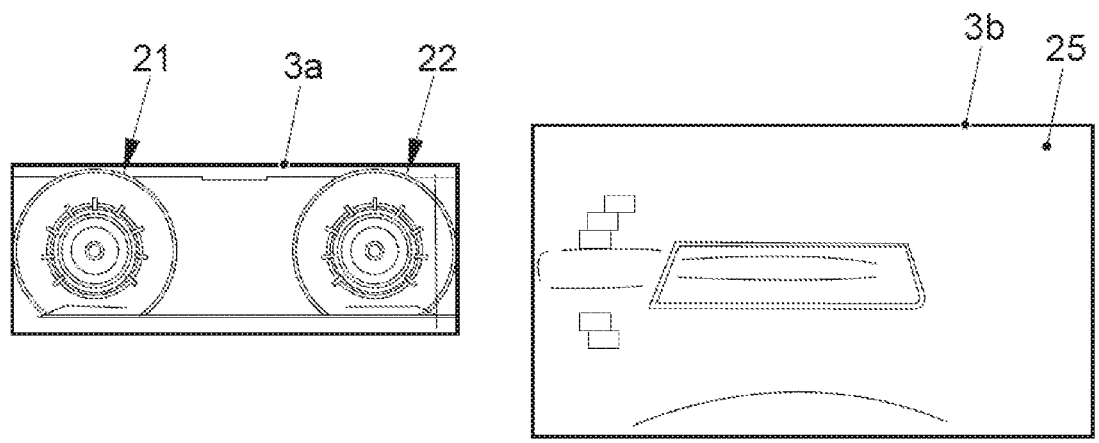
Figure 3E:
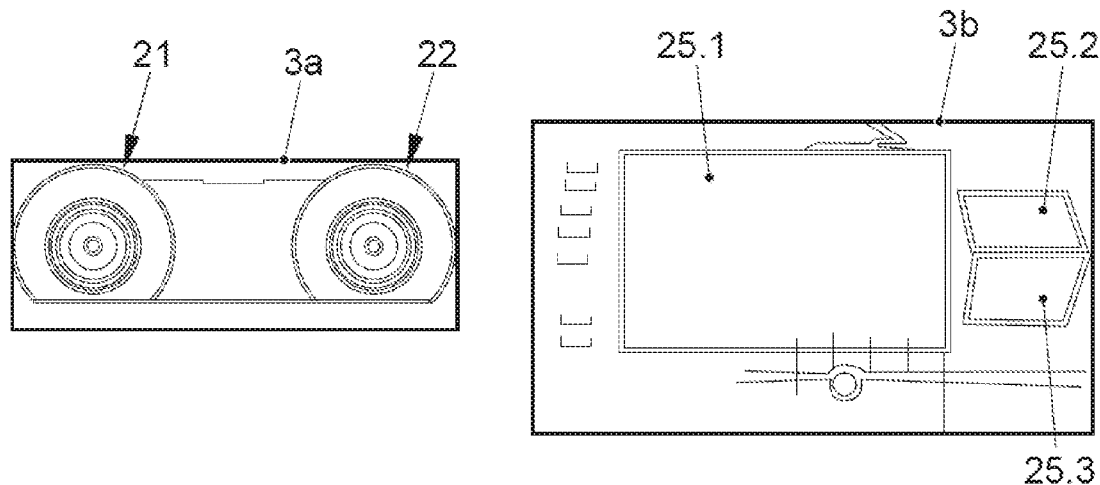
Figure 3F:
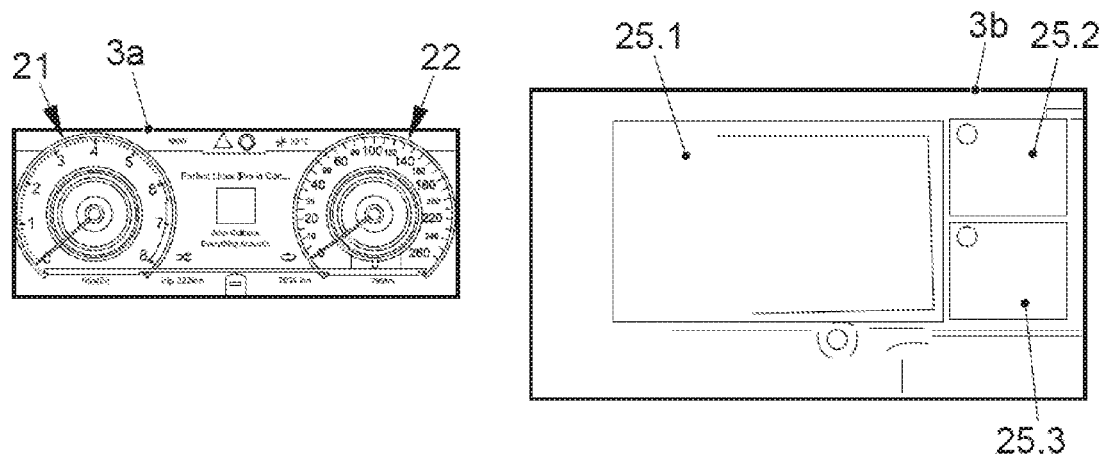

In this process, as shown in FIGS. 3D to 3F, an application region 25 comprising the application areas 25.1, 25.2, 25.3 is created in the region of the second display area 3b. These application areas are depicted here as operating tiles, with these tiles appearing by a rotational movement in which the operating tiles are depicted as "opening up".

Figure 3G:
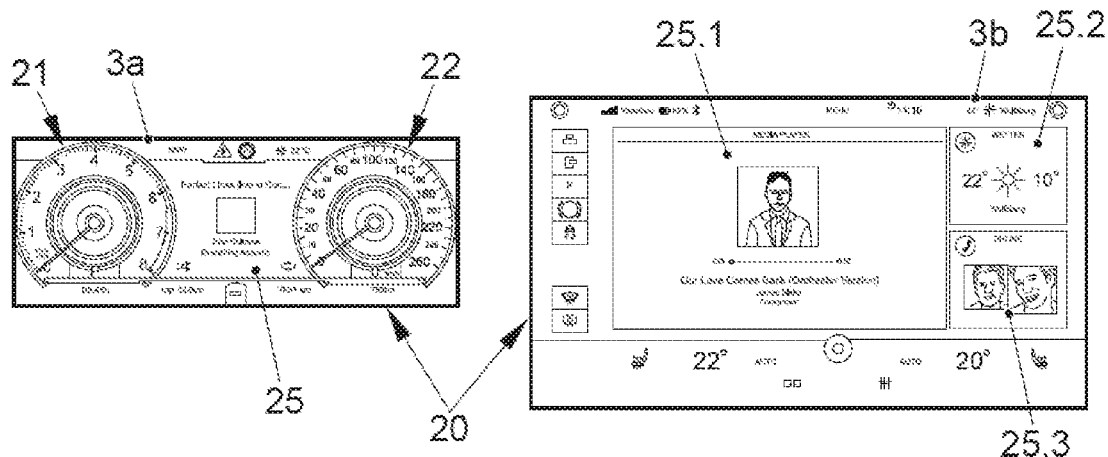

At the end of the graphical animation, the interface structure is stationary and without content; in particular, the application areas 25.1, 25.2, 25.3 are depicted as gray operating tiles for which no output data from application programs is displayed. This is the case shown in FIG. 3F. Subsequently, as shown in FIG. 3G, output data is displayed in the region of the application areas 25.1, 25.2, 25.3, which output data comes from each of the associated application programs of the processor 6.

In this disclosed embodiment, the method can be applied easily to different designs of the user interfaces of different vehicle models by a standard (generic) animation. The first view 10 and second view 20 can be created largely independently of the currently executed or available application programs, because it is not until a last operation that the output data of the applications is displayed. The application areas 25.1, 25.2, 25.3 can be used here as a generic animation template, which can be adapted to different content and output data. Predetermined sizes can be used here for the application areas 25.1, 25.2, 25.3, which can be pre-animated without content, however, the content being faded in only at the end of the method as the output data loaded from the applications at this point in time. The application areas 25.1, 25.2, 25.3 are embodied in this case as operating tiles, or what are known as interface tiles.

The animation of the transition from the first view 10 to the second view 20 can be used to bridge the time taken by the boot-up of the processor 6 running in the background and by the contents loading process, because this procedure takes a certain time period to finish completely.

In the animation, an interaction of the two display areas 3a, 3b is output by a smooth movement from the first display area 3a to the second display area 3b. The light pulse 12 moves between the display areas 3a, 3b. It is also important here that the display is precisely coordinated in time to achieve a smooth movement.

In various exemplary embodiments, the light pulse 12 can be created in different ways and using different graphical elements. For instance, a light ray can be depicted moving from the first graphical object 11 out to the sides of the first display area 3a and taking "in its wake" graphical elements of the second view 20. These graphical elements may be square tiles, for instance, which migrate from left to right, for example; light-shining contours can be depicted, for which a moving light effect is shown around the outlines of the application areas 25.1, 25.2, 25.3, or a light beam can be displayed that can be used to illuminate from one side a 3D interior shown in perspective behind the operating tiles and then disappears at the end. It can also be provided here, for example, that the view is created in a particular manner according to the time of day, where it is possible to use different light effects.

LIST OF REFERENCES 1 vehicle
2 control unit
3a first display area
3b second display area
4 receive unit
5 graphics unit
6 processor
7 non-volatile storage medium
10 first view
11 first graphical object
12 light pulse
20 second view
21 first display object
22 second display object
23 dial
23.1, 23.2, 23.3 dial segments
24 pointer object
25 application region
25.1, 25.2, 25.3 application area

The invention claimed is:

1. A method for operating a vehicle information system including a processor, a digital instrument cluster, and a center console display, the method comprising:
generating, in response to an activation signal, graphical data for an activation animation containing a first view comprising a first graphical object and displaying the first graphical object within the digital instrument cluster; and,
generating and displaying, in response to a transition signal received when an approach action, an unlocking action, a door-opening, a user entering or sitting-down or a vehicle being started is detected and after the first view is no longer displayed, graphical data for the activation animation containing a second view,
wherein the digital instrument cluster and the center console display are non-contiguous with one another,
wherein displaying the second view comprises a movement effect that depicts a movement of a light pulse emanating from the digital instrument cluster and propagating toward the center console display to aid perception of the movement of the light pulse between the non-contiguous instrument cluster and the console display, and
wherein generating and displaying the activation animation is according to a progress over time of a start-up procedure of the processor.

2. The method of claim 1, wherein the activation signal is received when an approach action, an unlocking action, a door-opening, a user entering or sitting-down or a vehicle being started is detected.

3. The method of claim 1, wherein the display of the first view and/or second view involves a fade-in.

4. The method of claim 1, wherein the first graphical object comprises a logo.

5. The method of claim 1, wherein an animation sequence is retrieved from a non-volatile storage medium to generate the graphical data for the first view.

6. The method of claim 1, wherein the movement effect comprises depicting a movement of a region of heightened brightness.

7. The method of claim 1, wherein the second view is displayed by the digital instrument cluster and the center console display.

8. The method of claim 1, wherein the second view comprises a first display object and a second display object, wherein the display objects each comprise a dial and a pointer element.

9. The method of claim 1, wherein, in addition, operating data of the vehicle is acquired and the second view is generated based on the acquired operating data.

10. The method of claim 1, wherein the second view comprises at least one display object and an application region, wherein the application region comprises application elements.

11. The method of claim 10, wherein the application elements of the second view are associated with applications, and output data from the applications is displayed in the digital instrument cluster and the center console display after the second view has appeared.

12. A vehicle information system comprising:
a processor configured to perform a start-up procedure;
a receipt unit configured to receive an activation signal and a transition signal;
a graphics unit configured to generate, based on the activation signal and the transition signal, graphical data for an activation animation comprising a first view and a second view;
a digital instrument cluster and a center console display, which are configured to display the graphical data,
wherein, after the activation signal is received, the first view is displayed, wherein the first view comprises a first graphical object, and, after the transition signal is received, the first view is no longer displayed and the second view is displayed, wherein the transition signal is received when an approach action, an unlocking action, a door-opening, a user entering or sitting-down or a vehicle being started is detected,
wherein the digital instrument cluster and the center console display are non-contiguous with one another,
wherein the display of the second view comprises a movement effect that depicts a movement of a light pulse emanating from the digital instrument cluster and propagating toward the center console display to aid perception of the movement of the light pulse between the non-contiguous instrument cluster and the console display, and
wherein the display of the activation animation is according to a progress over time of the start-up procedure of the processor.

13. The vehicle information system of claim 12, wherein the activation signal is received when an approach action, an unlocking action, a door-opening, a user entering or sitting-down or a vehicle being started is detected.

14. The vehicle information system of claim 12, wherein the display of the first view and/or second view involves a fade-in.

15. The vehicle information system of claim 12, wherein the first graphical object comprises a logo.

16. The vehicle information system of claim 12, wherein an animation sequence is retrieved from a non-volatile storage medium to generate the graphical data for the first view.

17. The vehicle information system of claim 12, wherein the movement effect comprises depicting a movement of a region of heightened brightness.

18. The vehicle information system of claim 12, wherein the first graphical object of the first view is displayed by the digital instrument cluster.

19. The vehicle information system of claim 12, wherein the second view is displayed by the digital instrument cluster and the center console display.

20. The vehicle information system of claim 12, wherein the second view comprises a first display object and a second display object, wherein the display objects each comprise a dial and a pointer element.

21. The vehicle information system of claim 12, wherein, in addition, operating data of the vehicle is acquired and the second view is generated based on the acquired operating data.

22. The vehicle information system of claim 12, wherein the second view comprises at least one display object and an application region, wherein the application region comprises application elements.

23. The vehicle information system of claim 22, wherein the application elements of the second view are associated with applications, and output data from the applications is displayed in the display areas after the second view has appeared.

* * * * *